US009893953B1

(12) United States Patent
Castelli et al.

(10) Patent No.: US 9,893,953 B1
(45) Date of Patent: Feb. 13, 2018

(54) USING APPLICATION AWARE TEMPLATES

(75) Inventors: Brian A. Castelli, Fuquay Varina, NC (US); Kevin W. Phillips, Cary, NC (US); John M. Moran, Mebane, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 414 days.

(21) Appl. No.: 13/336,704

(22) Filed: Dec. 23, 2011

(51) Int. Cl.
*H04L 12/24* (2006.01)

(52) U.S. Cl.
CPC .................. *H04L 41/145* (2013.01)

(58) Field of Classification Search
CPC ... G06F 3/0605; G06F 3/067; H04L 67/1097; H04L 41/145
USPC ........................................................ 709/220
See application file for complete search history.

(56) References Cited

U.S. PATENT DOCUMENTS

| | | | | |
|---|---|---|---|---|
| 7,523,231 B1* | 4/2009 | Gupta | ................... | G06F 3/0605 707/999.009 |
| 7,904,652 B1* | 3/2011 | Castelli | ................ | G06F 3/0605 709/225 |
| 8,082,330 B1* | 12/2011 | Castelli | ................ | G06F 9/5016 709/220 |
| 8,095,764 B1* | 1/2012 | Bauer | ................... | G06F 3/0605 711/162 |
| 8,151,077 B1* | 4/2012 | Bauer | ................ | G06F 12/0802 711/118 |
| 8,171,398 B2* | 5/2012 | Hosotsubo | ............ | G06F 17/211 715/243 |
| 8,196,195 B2* | 6/2012 | Bartley et al. | ................... | 726/17 |
| 8,219,724 B1* | 7/2012 | Caruso et al. | ................... | 710/36 |
| 8,418,072 B1* | 4/2013 | Bauer et al. | ................... | 715/764 |
| 8,438,342 B1* | 5/2013 | Todd et al. | ................... | 711/153 |
| 9,372,866 B2* | 6/2016 | Provenzano | ...... | G06F 17/30162 |
| 9,384,207 B2* | 7/2016 | Provenzano | ...... | G06F 17/30162 |
| 9,563,378 B2* | 2/2017 | Mehta | ................... | G06F 3/0619 |
| 2003/0005119 A1* | 1/2003 | Mercier | ................ | G06F 3/0601 709/225 |
| 2005/0071348 A1* | 3/2005 | Laicher | ................... | G06Q 10/10 |
| 2006/0095664 A1* | 5/2006 | Wichelman | ........ | G06F 17/30138 711/114 |
| 2007/0016544 A1* | 1/2007 | Graefe | ............... | G06F 17/30587 |
| 2007/0240039 A1* | 10/2007 | Hosotsubo | ............ | G06F 17/211 715/210 |
| 2008/0306772 A1* | 12/2008 | Shahrokh | ........................ | 705/3 |
| 2011/0137679 A1* | 6/2011 | Ford | ....................... | G06Q 10/10 705/3 |
| 2011/0153507 A1* | 6/2011 | Murthy | ................. | G06F 9/5061 705/304 |
| 2012/0166177 A1* | 6/2012 | Beld et al. | ........................ | 704/9 |
| 2013/0111034 A1* | 5/2013 | Upadhya | ............... | G06F 3/0605 709/226 |
| 2016/0026501 A1* | 1/2016 | Polkovnikov | ....... | H04L 67/1097 709/215 |

* cited by examiner

*Primary Examiner* — Douglas Blair
(74) *Attorney, Agent, or Firm* — Deepika Bhayana; Krishnendu Gupta

(57) ABSTRACT

A method is used in using application aware templates for configuring data storage systems. An application aware template is received for configuring a data storage system. The application aware template includes a set of configuration preferences based on best practices for an application. The data storage system is configured based on the set of configuration preferences of the application aware template.

16 Claims, 12 Drawing Sheets

Mandatory Requirement = !

!Name of Template = Celerra NS - Microsoft Exchange 2003
Application associated with = Microsoft Exchange 2003
Description:
Inherits from:

Rules:
1 Exchange log must exist for every 2 Exchange Database for 500 Users

Hardware/Software Requirements:
Celerra Revision: > 5.5.27.4
Celerra Models: NS40, NS80, NSX

Storage Setup:

Celerra NS - Microsoft Exchange 2003 - Exchange Database for 500 Users
 Mandatory Requirement = !
 !Name of Template = Exchange Database for 500 Users
Application associated with = Microsoft Exchange 2003
Description:
Inherits from: Celerra NS - Microsoft Exchange 2003
Hardware/Software Requirements:
!Number of physical spindles: 4
!Type of spindles: FC
RPM of spindles: 15K
!RAID type: R1 1+1

Storage Setup:
Concatenate dvols in the same RAID group
Stripe the two meta volumes from each RAID group
Place the stripe in a user defined pool named exchangedb1pool1

Celerra NS - Microsoft Exchange 2003 - Exchange Log
 Mandatory Requirement = !
 !Name of Template = Exchange Log
Application associated with = Microsoft Exchange 2003
Description:
Inherits from: Celerra NS - Microsoft Exchange 2003
Hardware/Software Requirements:
!Number of physical spindles: 2
!Type of spindles: FC
RPM of spindles: 15K
!RAID type: R1 1+1

Storage Setup:
Concatenate dvols in the same RAID group
Place the stripe in a user defined pool named exchangelogpool1

FIG. 12

USING APPLICATION AWARE TEMPLATES

BACKGROUND

Technical Field

This application relates to using application aware templates.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems (also referred to as "storage array" or simply "array") may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration and allocation of storage, a customer may not have the appropriate level of sophistication and knowledge needed. Also, the particular level of knowledge may vary with each user. Additionally, a single user's knowledge level may vary for different applications and/or tasks that the single user may perform.

SUMMARY OF THE INVENTION

A method is used in using application aware templates for configuring data storage systems. An application aware template is received for configuring a data storage system. The application aware template includes a set of configuration preferences based on best practices for an application. The data storage system is configured based on the set of configuration preferences of the application aware template.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8-9 are representations of a graphical user interface and are an example of an embodiment of a computer system that may utilize the techniques described herein; and FIGS. 10-12 are representations of an application aware template and are an example of an embodiment of a computer system that may utilize the techniques described herein.

DETAILED DESCRIPTION OF EMBODIMENT(S)

Figure 1:
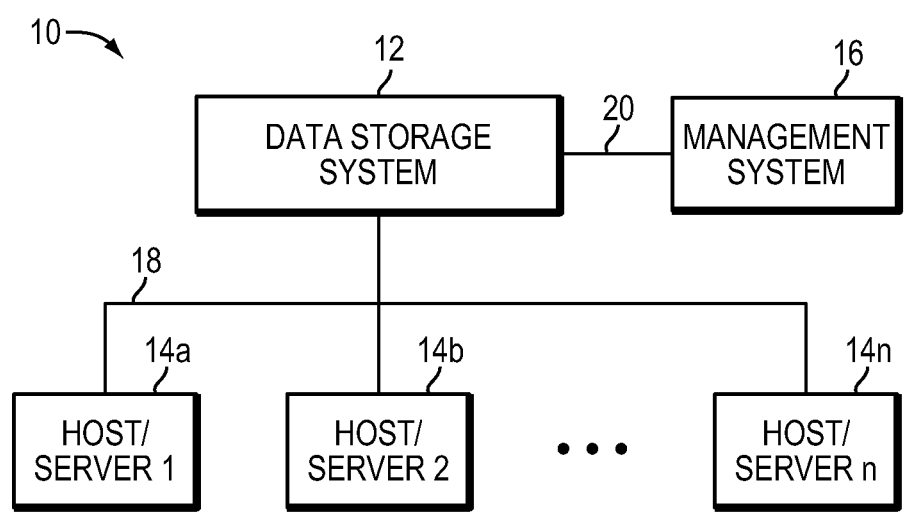
FIG. 1 is an example of an embodiment of a computer system that may utilize the techniques described herein.

Described below is a technique for use in using application aware templates, e.g., for configuring data storage systems, which technique may be used to provide, among other things, receiving an application aware template for configuring a data storage system, where the application aware template includes a set of configuration preferences based on best practices for an application and configuring the data storage system based on the set of configuration preferences of the application aware template.

In at least some scenarios, storage provisioning is a process of assigning storage (or "disk space") to applications executing on a data storage system. Storage is provisioned to each of the applications based on the requirements of each of the applications. For example, an application such as Microsoft® Exchange may require 100 gigabytes (GB) of space for storing emails, and the required storage space is provisioned from the total amount of storage available in a data storage system. However, a storage space allocated for one application cannot be used by another application. For example, if a storage space of 500 gigabytes (GB) is provisioned for a database that is currently using only 100 gigabytes (GB), the remaining storage space of 400 gigabytes (GB) goes unused until the application actually uses a portion of the remaining storage. However, when an amount of storage space provisioned for an application is less than the application requires, users may experience network or application performance problems. Additionally, in such a case, the application may use all the provisioned storage space and fail due to an out of space error. Conversely, provisioning more storage than an application requires may result in waste of storage resources.

Thin storage provisioning helps address the problem of allocated but unused storage space by assigning storage space to an application on an "as needed" manner. Thin storage provisioning creates a pool of virtual storage that is allocated (e.g., in thin logical units or volumes, also referred to as TLUs) to applications in a conventional manner. The pool of virtual storage is supported by a much smaller pool of actual storage that is provisioned to applications as an actual amount of storage space needed by applications. In a thin provisioned data storage system, a storage administrator tracks a storage capacity for the entire data storage system, instead of having to track the storage capacity for each application of the data storage system. However, when a thin provisioned data storage system runs out of storage space, the entire thin provisioned data storage system runs out of space, not just a single application.

Generally, storage administrators must provide users of applications with access to hundreds of gigabytes (even terabytes) of data, while making the efficient use of available storage space of a data storage system. When provisioning storage, a storage administrator must ensure that each application receives an adequate amount of space, while maintaining or improving performance of a data storage system. Typically, requirements of an application include a type of disk, a type of a storage tier, a type of RAID level, performance of the application, an initial storage capacity required by the application, and an amount of storage space required for potential growth of the application data. A storage space is provisioned to an application by allocating a storage pool suitable to the application based on requirements of the application.

Generally, requirements and configuration preferences for an application change rapidly over time. Thus, even though a data storage system may include application aware best practices for an application that are integrated into the data storage system, changes in requirements and configuration preferences for the application may require updating application aware best practices included in the data storage system.

Conventionally, a storage administrator manually provisions storage for an application executing on a data storage system. In such a conventional system, provisioning storage may be difficult, tedious and an error-prone process, requiring a detailed knowledge of requirements of an application. In such a conventional system, a storage administrator must possess knowledge of a scripting language and detailed knowledge of storage devices in order to write a script for allocating an adequate amount of storage space to an application. Thus, in such a conventional system, a storage administrator may select a storage pool that may not be a good fit for an application. Further, in such a conventional system, when requirements and/or best practices of an application configured on a data storage system changes, the data storage system must be upgraded to included changed requirements and/or best practices of the application. For example, typical storage requirements of Microsoft® Exchange application indicate that a log for Microsoft® Exchange application must be stored on a disk of a specific RAID type. Further, the log and a database for Microsoft® Exchange application may not share physical spindles of a disk. Further, I/O operations performed on the log are sequential in nature whereas I/O operations performed on the database are random in nature. Further, the number of I/O operations that are performed on the database are generally greater than the number of I/O operations that are performed on the log. Conventionally, in such a case, a storage administrator must perform a lengthy and manual process in order to configure storage of a data storage system based on the requirements and the I/O characteristics of the Microsoft® Exchange application. Conventionally in such a case, the process may include creating a file system on an appropriate RAID group, configuring network devices, LUNs and the application. As a result, in such a conventional case, a storage administrator may find this process complicated and cumbersome without extensive knowledge of storage configurations of the data storage system. Thus, in such a conventional case, one of the mechanisms a storage administrator may use is to manually configure storage based on requirements and best practices of an application by either understanding detailed requirement of the application or relying on documentations that provides detailed explanation of methods for configuring storage for the application. However, in such a conventional system, a manual method to configure storage space is prone to errors, amounts to a guess work, lacks repeatability and automation, and requires a storage administrator to constantly keep up with changing requirements of the application. Further, conventionally, a second mechanism used to configure storage space includes using a storage template. In such a conventional case, a storage template includes information such as how to configure LUNs, storage pool and RAID groups. However, in such a conventional system, a storage template does not include information regarding requirements and best practices of an application. Moreover, conventionally, a third mechanism used to configure storage in a data storage system includes implementing best practices of an application as part of a storage system software of the data storage system. However, in such a conventional system, developing best practices of an application consumes resources in order to create software code corresponding to the best practices of each application used by a storage administrator. Further, in such a conventional system, when requirements of an application changes, the storage system software must be upgraded to include updated code corresponding to changed requirements. Thus, in such a conventional case, an upgrade must be performed on the data storage system in order to upload updated code including the changed requirements.

By contrast, in at least some implementations in accordance with the technique as described herein, use of an application aware template for provisioning storage for an application and configuring the application on a data storage system based on best practices of the application provides an efficient method for configuring storage for a large number of applications without any detailed knowledge of a script or programming language. Additionally, in at least some implementations as described herein, an application aware template may be used repeatedly by a user. Further, in at least some implementations as described herein, the current technique provides a user of a data storage system (e.g., a storage administrator) with a user interface for registering, uploading and executing an application aware template. An application aware template includes a set of configuration preferences and may be created by any user (e.g., an engineer, a storage administrator, a customer service personnel, a sales personnel) possessing knowledge of best practices of an application. In at least one embodiment of the current technique, an application aware template is created, distributed and uploaded to a data storage system. In at least one embodiment of the current technique, a user (e.g., a storage administrator) of a data storage system selects an application aware template. The application aware template is then execution on the data storage. During execution, the data storage system verifies whether sufficient amount of storage space is available on the data storage system based on configuration preferences included in the application aware template. The storage space is then provisioned based on the configuration preferences. Thus, in at least one embodiment of the current technique, a data storage system may be configured based on best practices of an application by a user such that the user neither need to possess knowledge of the best practices of the application nor perform a series of manual operations for provisioning storage space.

In at least some implementations in accordance with the technique as described herein, the use of using application aware templates can provide one or more of the following advantages: simplifying a process of provisioning storage by enabling users to use application aware templates that are based on best practices of applications, reducing the amount of time required for provisioning storage by enabling users to create a customized version of an application aware template based on best practices of an application and use the application aware template for configuring the application, lowering cost of maintaining a data storage system by rapidly deploying new application aware templates upon encountering a change in a system environment such as changes in requirements of an application, changes in disk types, and changes in version of a server, efficiently provisioning storage space by reducing the number of errors involved in a manual configuration process, and efficiently managing a data storage system by supporting multiple versions of an application aware template that are based on different requirements of an application, creating an application aware template that is based on a published documentation including best practices of an application and managing application aware templates associated with multiple versions of the application without having to upgrade a data storage system software.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. As an example in connection with a medical office application server component that may executed on one or more of the hosts 14a-14n, the data storage configuration tasks may include allocating or provisioning storage for storing patient medical data such as, for example, name, address, insurance information, office visit dates, vaccination records, payments, image files containing x-rays, and the like. Tasks performed in connection with provisioning storage to store patient medical data for the medical office application may include, for example, specifying the devices (logical and/or physical)

used to store the data, configuring the data storage devices used such as specifying whether data replication is performed for disaster recovery, and the like. Techniques that may be used in connection with performing data storage provisioning and configuration are described in more detail in following paragraphs in order to provide ease of use to users of the data storage system(s) 12.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for using application aware templates in data storage systems.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Described in following paragraphs are techniques that may be used to assist users of a data storage system in connection with performing data storage services such as related to data storage system configuration, provisioning of data storage, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. The user may elect to bypass the automation of best practices or limit the amount of automation performed by interacting with the system at various levels and instead choose to execute an application aware template based on best practices for provisioning storage for an application. Thus, in at least one embodiment of the current technique, even a novice user does not have to provide any input to a series of configuration questions posed to the user by a user interface for configuring storage for an application.

Figure 2:
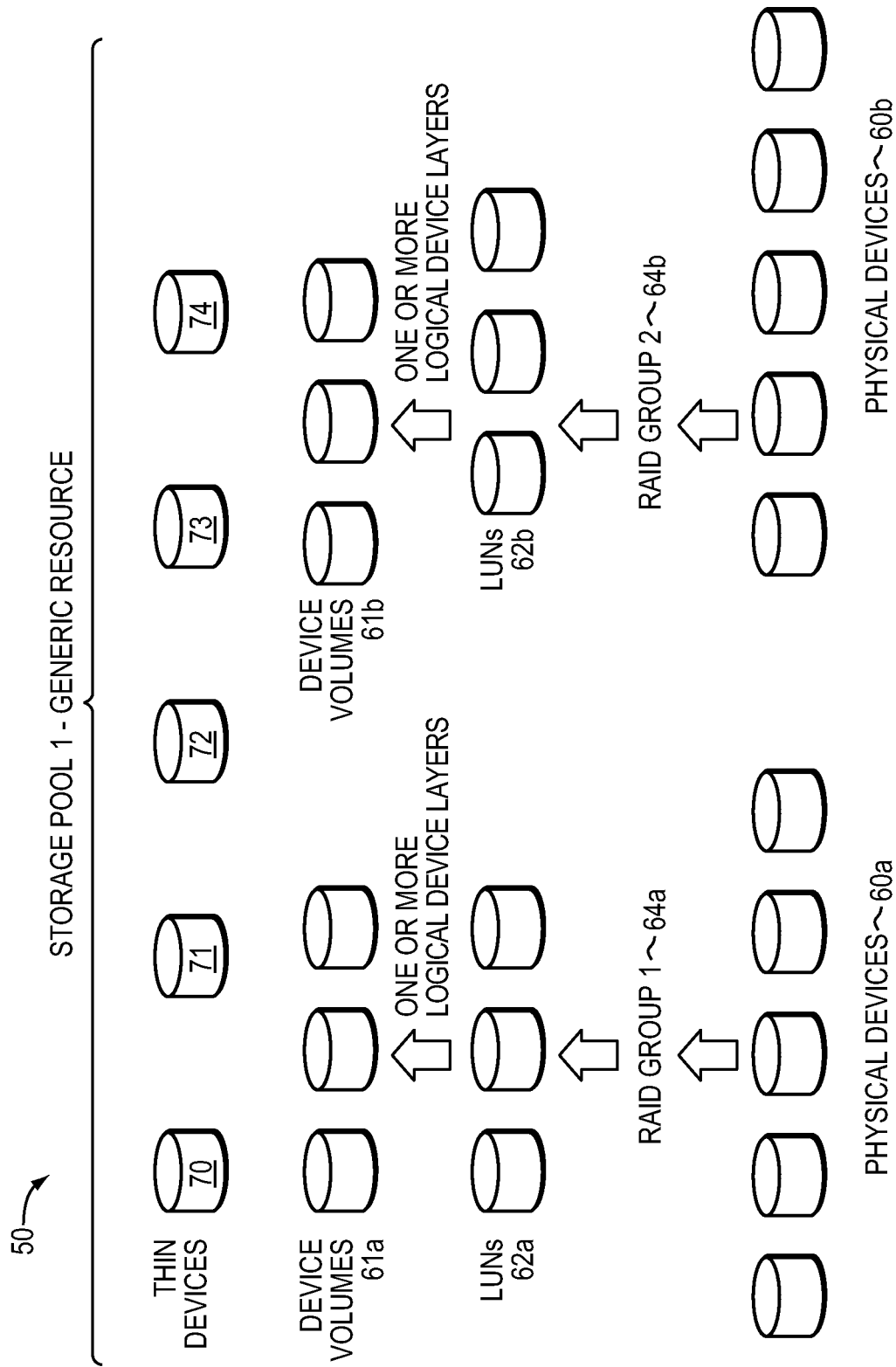
FIG. 2 is an example illustrating storage device layout.

Referring to FIG. 2, shown is an example representing how data storage system best practices may be used to form storage pools. A storage pool may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved.

A disk may be a physical disk within the storage system. A LUN may be a logical unit number which is an identifier for a Logical Unit. Each slice of data may have a mapping on the location of the physical drive where it starts and ends; a slice may be sliced again.

In at least one embodiment of the current technique, the example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61*a*-61*b*, which are logical devices that map logical storage space of the data device to physical storage space on the physical devices 60*a*-60*b*. Thus, an access of the logical storage space of the thin device results in either a null pointer (or equivalent) indicating that no corresponding physical storage space has yet been allocated, or results in a reference to a data device which in turn references the underlying physical storage space.

The data storage system best practices may define how to configure or form the generic storage pools, each storage pool having an associated generic storage pool type. Each underlying data storage system may have associated best practices specifying how to configure storage pools formed from physical devices in that particular data storage system. A storage extent may be formed or configured from one or more LUNs 62*a-b*.

Figure 3:
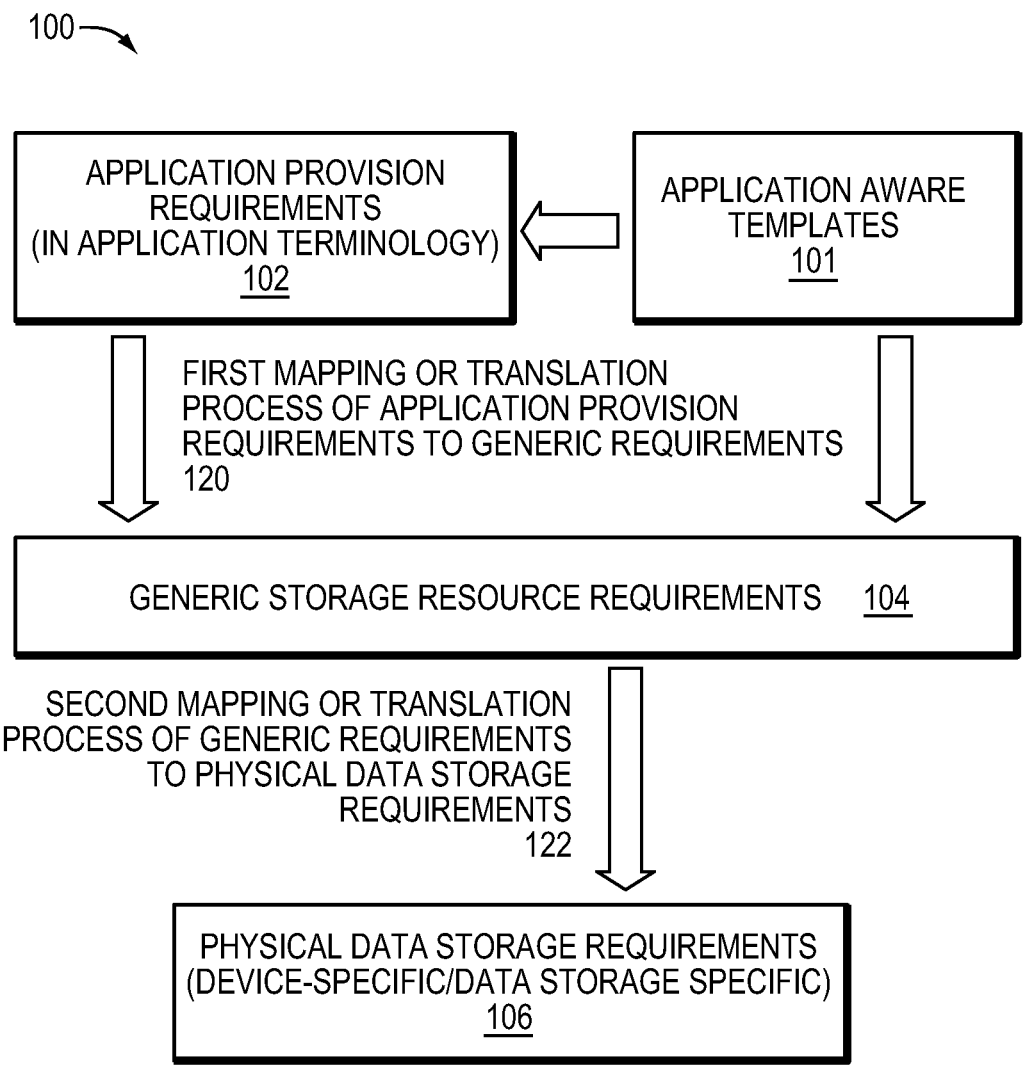
FIGS. 3-6 are diagrams illustrating in more detail components that may be used in connection with techniques herein.

Referring to FIG. 3, shown is an example representation of the processing that may be performed in an embodiment in accordance with the techniques herein. The example 100 illustrates the processing that may be performed in connection with a request to provision storage of a data storage system for use by an application. For example, a provisioning request may be made to allocate storage for a number of mailboxes for use by an email application. The example 100 includes application provision requirements 102 which may be mapped or translated into generic storage resource requirements 104 in a first mapping or translation stage 120. The generic storage resource requirements 104 may be mapped or translated into physical storage requirements 106 in a second mapping or translation stage 122. The mapping stage 120 may be performed in accordance with application best practices. The steps comprising stage 120 may vary with each application. The mapping stage 122 may be performed in accordance with data storage specific best practices. The steps comprising stage 122 may vary with the particular underlying data storage system.

The data storage specific best practices implemented as part of 122 in an embodiment may be based on experience, know-how, testing, and the like, in connection with provisioning and configuring storage for a particular data storage system. To illustrate, the mapping performed in the first stage 120 may vary with a particular email application, database application, and the like. A different set of processing steps may be performed for each of the foregoing applications in accordance with the application best practices of each application. The mapping performed in the second stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the second stage 122. Both the application best practices and data storage system specific best practices may be included in an application aware template in accordance with techniques herein to provide for automatically provisioning data storage system resources. An embodiment utilizing the techniques herein may configure storage for an application based on application best practices and data storage system best practices by executing an application aware template 101 based on the application best practices. As will be described in more detail herein, the best practices may be included in an application aware template using any one of a variety of different techniques known in the art such as, for example, using a script language, rules, programming language, comma separated files, XML file and the like. Although reference may be made to particular ways in which the techniques herein may be implemented for purposes of example and illustration, such reference should not be construed as a limitation of the techniques herein.

Each of the different requirements 102, 104 and 106 and the two mapping stages 120 and 122 will now be described in more detail.

In at least one embodiment, the application provision requirements 102 may specify the one or more provisioning requirements for a request. The requirements may make reference to application-specific terminology. The application provision requirements 102 may be the user inputs for the provisioning request received via a user interface (UI) using any one of a variety of different supported interfaces and techniques. The application provision requirements 102 may vary with user level and/or particular application for which the provisioning request is issued. In at least one embodiment of the current technique, a user may select an application aware template 101 via a UI. The application aware template includes a set of configuration preferences based on application best practices. Further, application aware template 101 may include requirements that may make reference to application specific terminology. Moreover, application aware template 101 may also include requirements that may make reference to data storage specific terminology.

In at least one embodiment, the UI may provide for one or more different types of user interfaces and associated data. For example, the UI may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. The application provision requirements 102 may vary with each of the different user proficiency levels of interaction that may be provided in an embodiment. Each of the different user levels may provide a different logical view and level of abstraction with respect to a data storage task to be performed for an application executing on one of the hosts. Each of the different user levels may provide a different level of detail with respect to the underlying operations and tasks performed on the data storage system in accordance with different levels of user sophistication and knowledge. The language or terminology of the UI and application provision requirements 102, UI data (e.g., content or data used to populate the UI menus), and UI presentation or structure (e.g., commands presented or particular hierarchical menu structure) may vary in accordance with the particular user level at which a user interacts with the data storage system as well as the application for which the provisioning request is being performed. Thus, a user may interact with the data storage system at a variety of different levels when issuing data storage configuration requests for the same application. The UI and application provision requirements may be customized for the particular level and application for which the request is performed. Further, the UI may include a mechanism for selecting an application aware template 101 for provisioning storage on data storage system 12.

The application provision requirements 102 may be mapped in the first mapping or translation stage 120 to generic resource requirements in accordance with application best practices. Additionally, the first mapping or translation stage 120 may generate other output, such as application-specific information including application-specific attributes. The application-specific information may not be used in connection with the specifying generic storage resource requirements or otherwise involved in the second mapping or translation process. The application-specific information, and possible uses thereof, are described in more detail below. Conventionally, the application best practices may be a codified instance of 120 for each application. By contrast, in at least one embodiment of the current technique, users can create application aware templates 101 based on application best practices, thereby eliminating or reducing the need to codify the application best practices in a storage system software.

The generic storage resource requirements 104 may be characterized as an expression of the provisioning request in terms of application-neutral or application independent data elements and application independent data element properties. The generic storage requirements 104 refer to data elements that may be used as a common way of expressing the storage requirements for many different applications. In contrast, the application provision requirements 102 may make reference to data elements which are application-specific such as a number of mailboxes. The application-specific requirements of 102, such as number of mailboxes, may be translated by 120 into application independent data elements that may be used as an intermediate expression of storage requirements for a provisioning request. As will be described in more detail in following paragraphs, generic storage requirements may refer to generic storage pools of storage volumes configured for use with servicing different application provisioning requests. For example, a storage pool of FAST storage may be defined. FAST storage may be defined as a general category of "fast" storage based on one or more different data storage system-specific properties which are used to characterize the storage pool and are used as part of the second mapping stage 122. Such data storage specific properties may not be expressly or specifically included in the generic storage resource requirements 104. Rather, the generic requirements of 104 may reference an abstract data storage element property of FAST based on one or more underlying data storage specific attributes. The particular properties and associated values used to define a FAST storage pool as well as other storage pools may vary with the underlying data storage system and associated data storage system best practices. A portion of storage from one of the storage pools, such as a volume or portion thereof, may be used in specifying generic data storage resource requirements 104. As another example, an embodiment may define one or more CHEAP storage pools along with one or more FAST storage pools for use in connection with specifying generic resource requirements 104. As with FAST storage pools, CHEAP may be an abstract data storage element property based on one or more data storage specific properties and values that vary with the underlying data storage system. The particular properties and values used to characterize and define a CHEAP storage pool may vary with data storage system and associated data storage system best practices. CHEAP may refer to a second type of data storage which may be characterized as inexpensive and not as fast in connection with servicing I/O requests relative to the storage pools of type FAST. In contrast to CHEAP storage pools, storage pools of type FAST may consist of faster device types and device configurations which may typically result in faster I/O request service times. Other embodiments may use a different number and different types or categories of storage pools other than FAST and CHEAP. In one embodiment as described herein, the generic storage resource requirements may be expressed in terms of generic data storage elements, such as storage pools and portions thereof, having one generic data storage element properties, such as FAST or CHEAP.

As described above, the first mapping or translation stage 120 may output generic storage resource requirements and also application-specific information or application specific attributes. The application-specific information may be characterized as additional attributes associated with the generic storage resource requirements but which are not used in connection with the second mapping stage 122. The generic storage resource requirements are mapped in the second mapping stage 122, but not the application-specific information is not utilized. The application-specific information may be used to provide additional information regarding the generic provisioned storage for other purposes. For example, the application-specific information may be used in connection with further annotating provisioned storage and presenting the information to a user. The application-specific information may be used in annotating other information maintained and used for other purposes than the second mapping stage 122 as described herein. For example, the application-specific information may include application-specific attributes associated with data objects of a data model used in presenting information on currently allocated and provisioned storage to the user. As such, the first mapping stage 120, in addition to producing the generic storage resource requirements, may produce other types of outputs used in connection with other processing operations, tasks, and data models.

The generic storage resource requirements 104 may be mapped by the second mapping or translation stage 122 into physical data storage requirements 106. The requirements 106 may vary with the particular type of data storage system (e.g., different data storage system by same or different vendor), customer's configuration and data storage environment (e.g., which data storage system types, number of each, vendor), number and type of devices on each data storage system (e.g., disks, disk or other device characteristics such as capacity, number of disks), and the like. The requirements 106 identify data storage system resources used in connection with implementing or fulfilling a request to provision storage for use by the application. Such resources may include the one or more physical devices from which storage is allocated for use in storing data and any parity information. In an embodiment in which the data storage system is a multiprocessor architecture, a designated processor of the data storage system may be assigned to service I/O requests for one or more portions of the allocated storage. The processing of stage 122 maps the generic requirements of 104 in accordance with the different data storage specific properties that may be associated with each storage pool to the physical resources of the data storage system. As an example, each storage pool may be formed from one or more different RAID groups of physical devices. A provision request for a volume of storage in a storage pool is mapped to a portion of physical storage in accordance with the data storage best practices codified in 122. With reference to the generic storage requirements 104 that may refer to a volume in a FAST or CHEAP storage pool, data storage system best practices may determine how FAST and CHEAP are defined for each type of data storage system.

In connection with the techniques herein, an embodiment implementing application best practices does not have to have any knowledge regarding the underlying data storage system and data storage system best practices. In other words, the application best practices and the data storage best practices may be developed independently of one another in accordance with the techniques herein. As a result, an instance of an application best practice implemented as part of application aware templates 101 may be used with any one or more different implementations of data storage best practices of 122. Similarly, an instance of data storage best practices 122 may be used with any one or more different implementations of application best practices of 101 for different applications.

To further illustrate with respect to FIG. 2, the application aware templates may have an application-specific focus and provide a level of abstraction customized for an application such as, for example, a particular email application, law office application or medical office application, as well as a class of related applications, such as a multiple email applications. The application aware templates may vary with the particular application as well as user level. For example, if the application is a law office application, the interface language, menu options, and the like, may be tailored to the law profession and particular law office application. As such, the first mapping or translation step 120 may use one set of rules, mappings, script, and the like, for each application to implement the application specific best practices for the one or more provided user levels. For example, a first script for the medical office application may be used to map the user input parameters using medical office terminology to the generic storage requirements 104. A second script for the law office application may be used to map the user input parameters using law office terminology to generic storage resource requirements 104. The user connecting to the data storage system may be provided with a UI in order to select an application aware template that is customized for the selected level and application to perform a requested data storage configuration.

The generic storage resource requirements 104 may not be tailored for any particular application. In other words, the generic storage resource requirements specifies a common terminology (e.g., data elements, model, properties, etc.) for expressing provision requests for multiple applications such as the medical application, law office application, email application, database application, and the like. The requirements 104 are mapped to physical data storage requirements 106 using second mapping or translation processing defined by data storage system best practices codified as part of 122. The physical data storage system requirements 106 may be customized for the particular storage vendor and associated options. For example, the requirements 106 may be specified in terms of particular physical data storage devices and attributes, RAID levels and techniques, SCSI and iSCSI terminology, vendor-specific options, and the like. The best practices and the automation of the best practices as described in more detail in following paragraphs may be customized for a particular application and the particular data storage system and environment.

A policy may be defined in an embodiment in accordance with the best practices for applications and data storage systems. A policy may be characterized as an instantiation of the application practices and/or data storage system best practices in an embodiment. A policy including application best practices may specify defaults used in connection with the different user levels for one or more applications. For example, for an email application, the policy may specify a default amount of mailbox data storage capacity and log storage capacity for each mailbox or group of mailboxes, may indicate that mailbox data is stored on FAST storage and that log data is stored on CHEAP storage, and may also specify other application independent or application-neutral criteria that may be used in servicing the provisioning request. The other criteria may include whether the data storage for the application should be allowed to share a RAID group with a different application thus affecting I/O performance, whether the storage needs to be expandable for use with the application's future storage needs, an expansion factor or amount indicating a threshold minimum amount of available storage for use with future data storage needs of the application, and the like.

Figure 4:
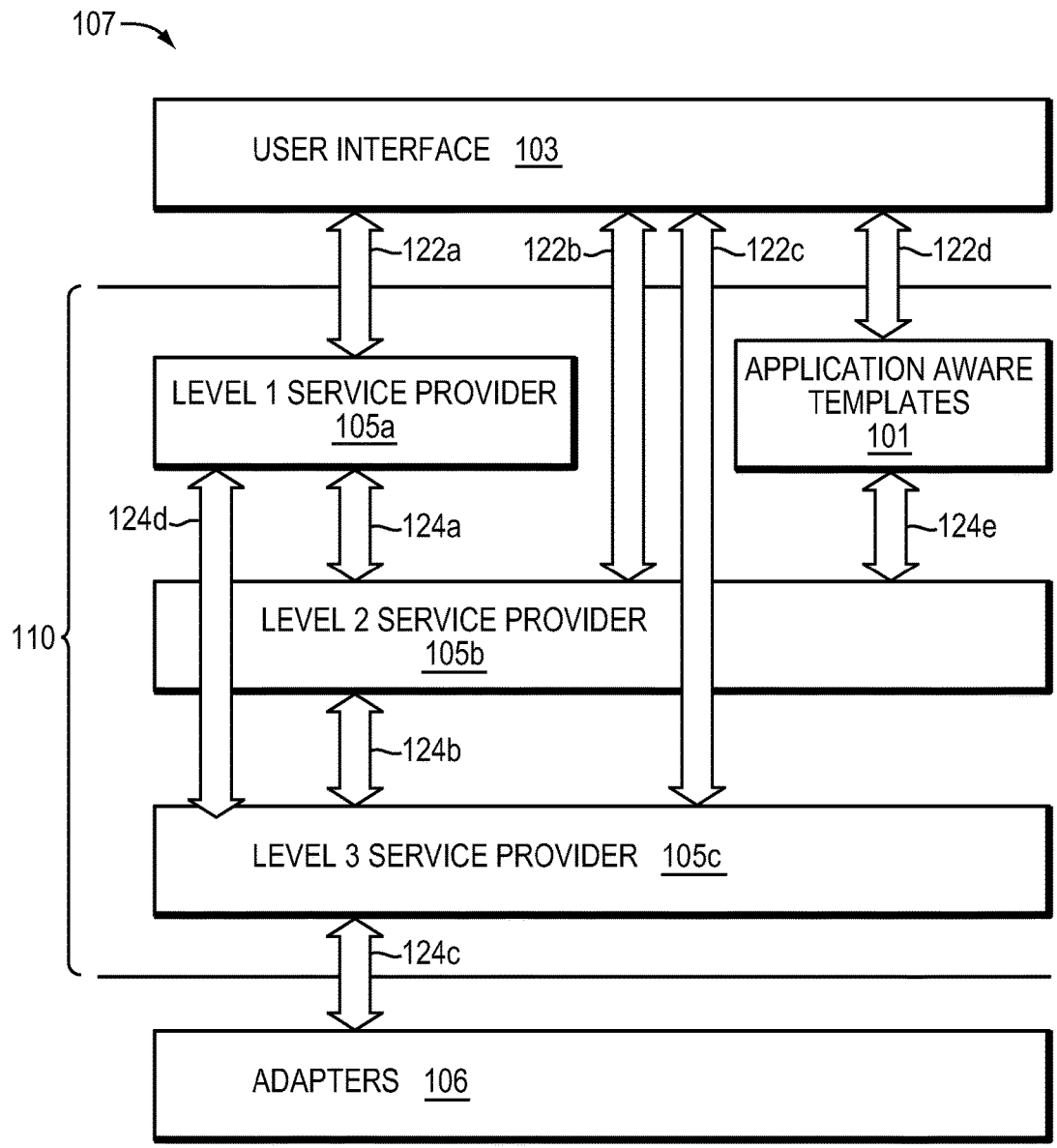

Referring to FIG. 4, shown is an example representation of components that may be included on the data storage system 12 for use in performing the techniques herein for data storage configuration. The example 107 includes a user interface 103, application aware templates 101, one or more levels of service providers 110, and adapters 106. In the example 107, the element 110 includes three service provider layers or levels 105a-105c. It should be noted that although 3 service provider levels are shown in FIG. 4, an embodiment may include any number of service provider levels.

The adapters 106 are used in connection with facilitating communications between the service providers, such as the level 3 service provider 105c, and other components. The different service providers included in the example 107 may be able to communicate directly with one another. However, when one of the service providers at one of the levels communicates with another component other than one of the service providers, an adapter may be utilized. An adapter may be characterized as a layer of software between one of the service providers, such as service provider 105c, and another component, such as a lower-level component invoked to implement data storage platform specific functionality. An adapter 106 may convert a service provider API to the API of another component. As an example, the service provider 105c may perform a call to an external component to create a file system. An adapter 106 may be used as an intervening layer between 105c and the external component in which the adapter 106 converts the API call from 105c to the API of the external component. The conversion may include, for example, mapping parameters between the API calls, performing multiple calls to the external component for the one API call from 105c, and the like. It should be noted that an adapter 106 may not utilized if such conversion is not needed.

The user interface (UI) 103 provides for one or more different types of user interfaces and associated data, and an interface for selecting an application aware template. For example, the UI 103 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. In connection with the techniques herein, a user may interact through the UI 103 with any one of the different levels of service providers 105a-105c when performing data storage configuration requests. Further, a user may interact through the UI 103 to select an application aware template from a list of application aware templates 101 registered on data storage system 12. Each of the service providers of 110 may provide a different level of detail or abstraction with respect to the underlying operations and tasks performed on the data storage system in accordance with different levels of user sophistication and knowledge.

As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In at least one embodiment, the UI 103 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. Conventionally, the UI 103 may provide multiple different user interfaces in accordance with the different levels allowing a user the option of connecting and interacting with the data storage system at any level. For example, in such a conventional case, a level 1 user may not have to issue a data storage configuration request to provision storage for storing patient data of medical office application executing on one of the hosts by specifying a minimal amount of information in connection with the request, but the user must interact with the UI 103 by providing a series of answers to questions posed to the user. By contrast, a user may simply select an application aware template for provisioning storage thereby eliminating or reducing the need to interact with the multiple user interfaces at different level of expertise. Thus, for example, in at least one embodiment of the current technique, a user may simply select an application aware template associated with medical office application which in turn is executed on data storage system 12 and provisions the storage by interacting with service provider layers.

In at least one embodiment, user interface 103 enables a user to select an application aware template. The user interface 103 then communicates information regarding the application aware template selected by the user to any one of the service providers (e.g., level 1 105a, level 2 105b, level 3 105c) based on different level at which the user interacts with the user interface 103. In at least one embodiment, the user interface 103 may communicate with level 1 service provider 105a based on contents of an application aware template and a level of sophistication for the user. In at least another embodiment, the user interface 103 may communicate with level 2 service provider 105b based on contents of an application aware template and a level of sophistication for the user. Further, in at least another embodiment, the user interface 103 may communicate with level 3 service provider 105c based on contents of an application aware template and a level of sophistication for the user. Thus, an application aware template enables data storage system 12 to provide functionality for the user interface 103, and service provider levels 105a-105c in such a way that the user interface 103 and service provider levels 105a-105c may be implemented independent of a type of an application because an application aware template includes information (such as best practices) of the application. For example with reference to the level 1 request for the medical application described above, the user interface 103 may provide information regarding the application aware template to the level 2 service provider 105b. Provider 105b may then communicate with the level 3 service provider 105c to implement the request and allocate the requested storage along with specifying other defaults such as, for example, a default level of data protection. The service provider 105c may communicate with other data storage system hardware and/or software when implementing the configuration request.

As illustrated in the example 107, a service provider at a level n may generally communicate, directly or indirectly, with one or more other service providers at levels lower than level n when processing a data storage configuration request. A user may select the level of interaction and the user's data configuration request is received at the data storage system by the UI 103. The UI 103 in turn either communicates with the appropriate level service provider to initiate the request or execute an application aware template selected by the user. Furthermore, a request received at a first level can result in multiple requests to a lower level to perform an operation. For example, a user may select an application aware template 101. In response, the more than one request may be issued to provider 105b. In turn, each request to provider 105b may result in one or more requests to provider 105c which, in turn, communicates with adapters and other code modules to perform the requested operation.

In one embodiment, the service providers 105a-105c may be code modules which are included in the same appliance. Each of the service providers 104a-104c may provide a published interface or API (application programming interface). A first service provider at level n may issue a request of another lower level service provider by issuing an API call to the lower level service provider. The API may also be used to facilitate communications between the UI 103 and the different level service providers of 110. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 110 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

Figure 5:
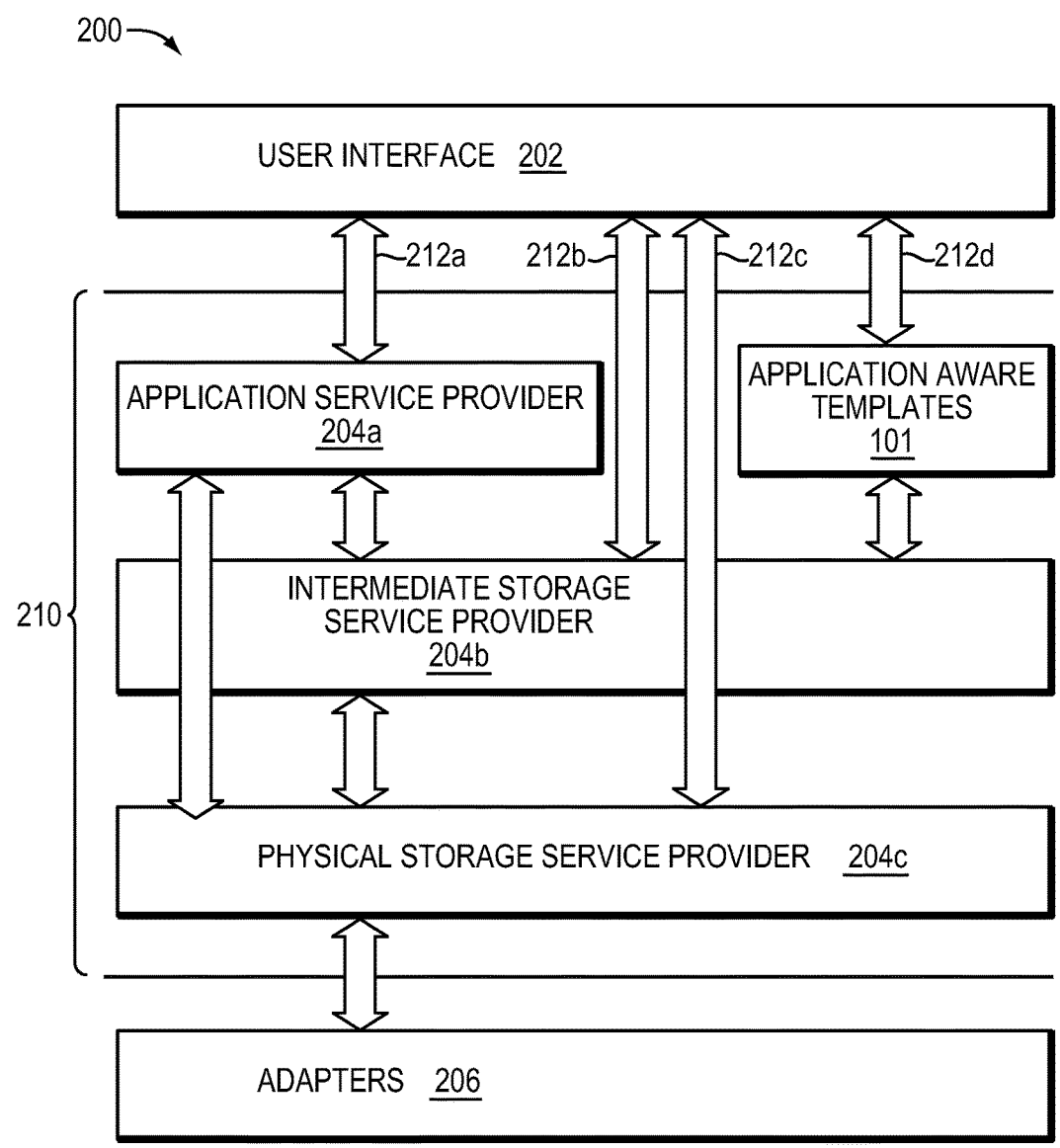

Referring to FIG. 5, shown is another example representation of components that may be included on the data storage system 12 for use in performing the techniques herein for using application aware templates. The example 200 is a more detailed illustration setting forth a particular instance of the different service providers and levels that may be included in an embodiment. Elements 202 and 206 are similar, respectively, to elements 103 and 106. Element 210 includes 3 service providers: application service provider 204a, intermediate or generic storage service provider 204b and physical storage service provider 204c. With respect to a level hierarchy, 204a may correspond to level 1 service provider 105a of FIG. 4, 204b may correspond to level 2 service provider 105*b* of FIG. 4, and 204*c* may correspond to level 3 service provider 105*c* of FIG. 4.

The application service provider 204*a* and application aware templates 101 may have an application-specific focus and provide a level of abstraction customized for an application such as, for example, a particular email application, law office application or medical office application, as well as a class of related applications, such as a multiple email applications. The intermediate storage service provider 204*b* may be an intermediate or second level of user interaction. As illustrated, user interface 202 may enable a user to select an application aware template 101 and provide information regarding the application aware template selected by the user to service provider 204*b* when implementing a request for data storage provisioning. The physical storage service provider 204*c* provides the most detailed or greatest level of exposure of the underlying data storage system. The provider 204*c* may be customized for the particular storage vendor and associated options.

Further, the application service provider 204*a* may include information regarding application best practices. Thus, in at least one embodiment, data storage system 12 may further simplify a process of provisioning storage in the data storage system for a user by using information regarding application best practices that are implemented in the application server provider layer 204*a*, and by using an application aware template that includes a set of rules indicating application best practices. As a result, in at least one embodiment, an application aware template enables a data storage system to include a component (e.g., software module such as a user interface, service provider layers) in the data storage system such that the component may be implemented independent of a type of an application. Further, in at least another embodiment, a data storage system may use an application aware template in conjunction with a component of the data storage system that includes application best practices and requirements in order to simplify a process of provisioning storage in the data storage system.

Providing different levels of application-specific user interaction as described above, where each level may vary with the knowledge required to perform a data storage configuration operation such as a provisioning request for a particular application, is further described, for example, in U.S. Pat. No. 7,523,231, Apr. 21, 2009, Gupta et al. APPLICATION AWARE STORAGE (the '231 patent), which is incorporated by reference herein. The '231 patent describes use of different application-specific user interactions with file systems and/or block storage in order to provide varying levels of automation in accordance with different levels of user knowledge for provisioning. As such, the '231 patent describes an embodiment in which a user may be exposed to varying levels of detail regarding file systems and block storage device configuration, where the level of detail exposed varies with a selected level of user interaction and expected knowledge or skill.

Figure 6:
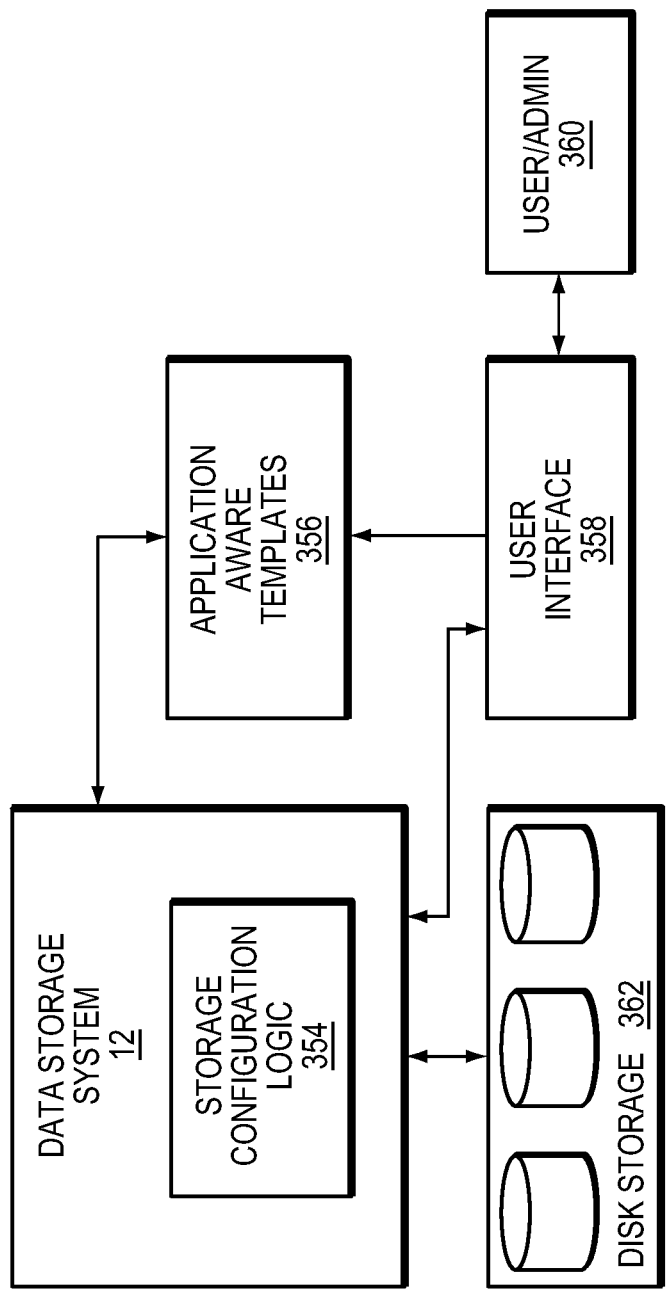

Referring to FIG. 6, shown is detailed representation of components that may be included in an embodiment using the techniques herein. In at least one embodiment of the current technique, a host system connected to data storage system 12 may include one or more applications, and an API (application programming interface). The data storage system 12 may include a web server, disk storage 362, and software executing thereon comprising a file system layer and a block storage layer. User interface 358 communicates with data storage system 12 and may include a GUI (graphical user interface) and/or a CLI (command line interface). Further, user interface 358 may either reside on the data storage system 12 or on a remote system coupled with data storage system 12. The GUI interface may correspond to one type of UI represented by element 103 of FIG. 4 and element 202 of FIG. 5. A user (e.g., a storage administrator) 360 may use user interface 358 for providing functionality as described herein such that the user may interact with the data storage system 12 in order to use application aware templates 356.

The user interface 358 may communicate with the data storage system 12 in connection with a request such as to select and execute an application aware template for provisioning storage for a particular application. An application executing on the host may be, for example, an email application, a medical office application, a law office application, and the like. In at least one embodiment of the current technique, an application aware template may be created in a format such as XML text file which may include a set of configuration preferences such as rules (e.g., based on XML schema). It should be noted that an application aware template may be created in any one of the file formats such as but not limited to a text file, an XML file, a comma separated file, and a name value pair file). In at least one embodiment of the current technique, an application aware template may include configuration preferences such as storage configuration of LUNs, file systems and storage pools, and capabilities of storage pools. The configuration preferences describes best practices for a specific application for a set of operating system environments. For example, in at least one embodiment, a user may create and deploy application aware templates for each of the following use cases:

Microsoft® Exchange configuration for 50-500 users
    Microsoft® Exchange configuration for 501-1,500 users
    Microsoft® Exchange configuration for 1,501-5,000 users In at least one embodiment of the current technique, in case a data storage system is upgraded to include an updated version of Microsoft® Exchange which requires a new set of best practices, a new set of application aware templates based on the new set of best practices may be created and used by users of the data storage system without having to upgrade a storage system software on the data storage system. In at least one embodiment of the current technique, user interface 358 includes a mechanism for uploading an application aware template 356 on data storage system 12. The application aware template is then stored in a specific location within data storage system 12 such that the application aware template may not be edited or modified by the user. User 360 selects an application aware template from a set of application aware templates 356 and attempts to upload the application aware template by verifying whether configuration preferences included in the application aware template may be applied to data storage system 12 based on storage configuration policies of the data storage system 12. Further, the data storage system 12 verifies whether sufficient amount of storage space is available in the data storage system 12 for provisioning storage space based on the configuration preferences of the application aware template. For example, if the maximum size of a file that may be created on the data storage system is 16 Terabytes (TB), an application aware template that includes a configuration preference indicating a request for provisioning storage space greater than 16 TB is found to be invalid. When an application aware template is validated by data storage system 12, the application aware template is registered as available application aware template such that the application aware template is displayed via user interface 358 to user 360 for selection. Further, a set of application aware templates may be grouped together to create a package which may be provided via user interface 358 to data storage system 12. Additionally, data storage system 12 may allow user 360 to modify configuration preferences of an application aware template by providing a set of parameters that are provided to the application aware template by the user. Further, it should be noted that a process that validates an application aware template may also include validation procedure associated with verifying checksums, and encrypting and/or decrypting the application aware template.

Thus, in at least one embodiment of the current technique, using application aware templates simplifies storage provisioning process for a user allowing the user to either upload existing application aware templates based on application best practices or create application aware templates based on application best practices used by the user that can be used repeatedly. Further, an application aware template may be created by any user such as storage vendors, storage administrators, and users of storage systems. Further, a user may respond quickly to new versions of applications by creating new application aware templates corresponding to the new versions of applications.

It should be noted that an application aware template may be provided to a user using any one of the known mechanism such as but not limited to an internet, an intranet, a website link, through ftp protocol, a HTTP protocol, and a flash drive. Further, a user may upload an application aware template by using a command line interface, a plug-in application, and/or a stand-alone application. Moreover, an application aware template may be uploaded using a remote system connected to data storage system 12 or using an user interface of data storage system 12.

Figure 7:
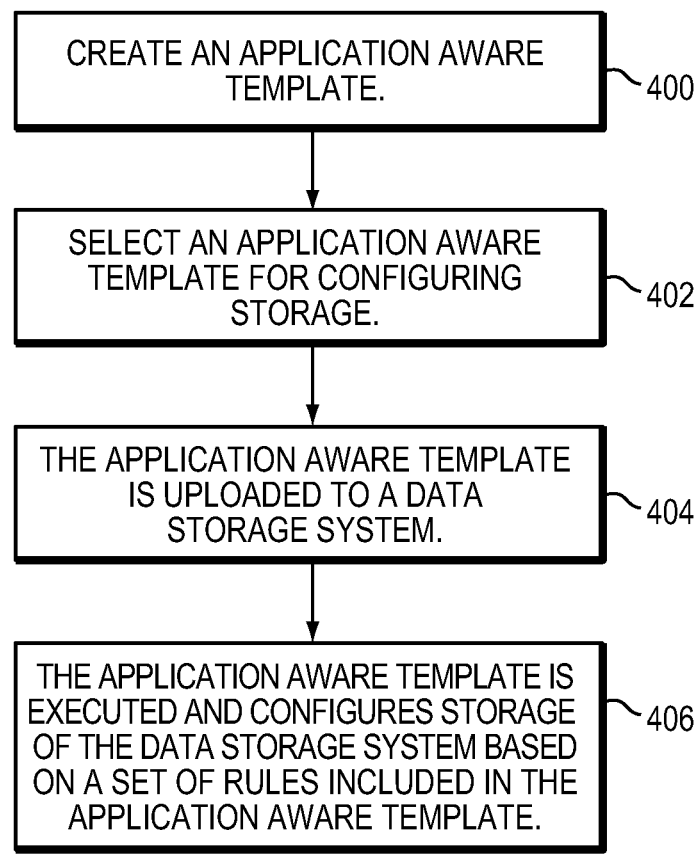
FIG. 7 is a flow diagram illustrating processes that may be used in connection with techniques herein.

Referring to FIG. 7, shown is a flow diagram illustrating the method of using application aware templates in data storage systems. With reference also to FIG. 6, an application aware template describing best practices of an application is created (step 400). A user selects the application aware template for provisioning storage based on the best practices of the application (step 402). The application aware template is uploaded to data storage system 12 (step 404). The application aware template is executed by data storage system 12 such that storage space is configured based on configuration preferences (e.g., storage configuration rules) included in the application aware template (step 406).

Figure 8:

Referring to FIG. 8, shown is an illustration of one of the many ways an application aware template may be selected by a user in data storage systems. Shown in FIG. 8 is an example of snapshot 410 of a user interface of data storage system 12 indicating a list of available application aware templates that may be selected by a user.

Figure 9:
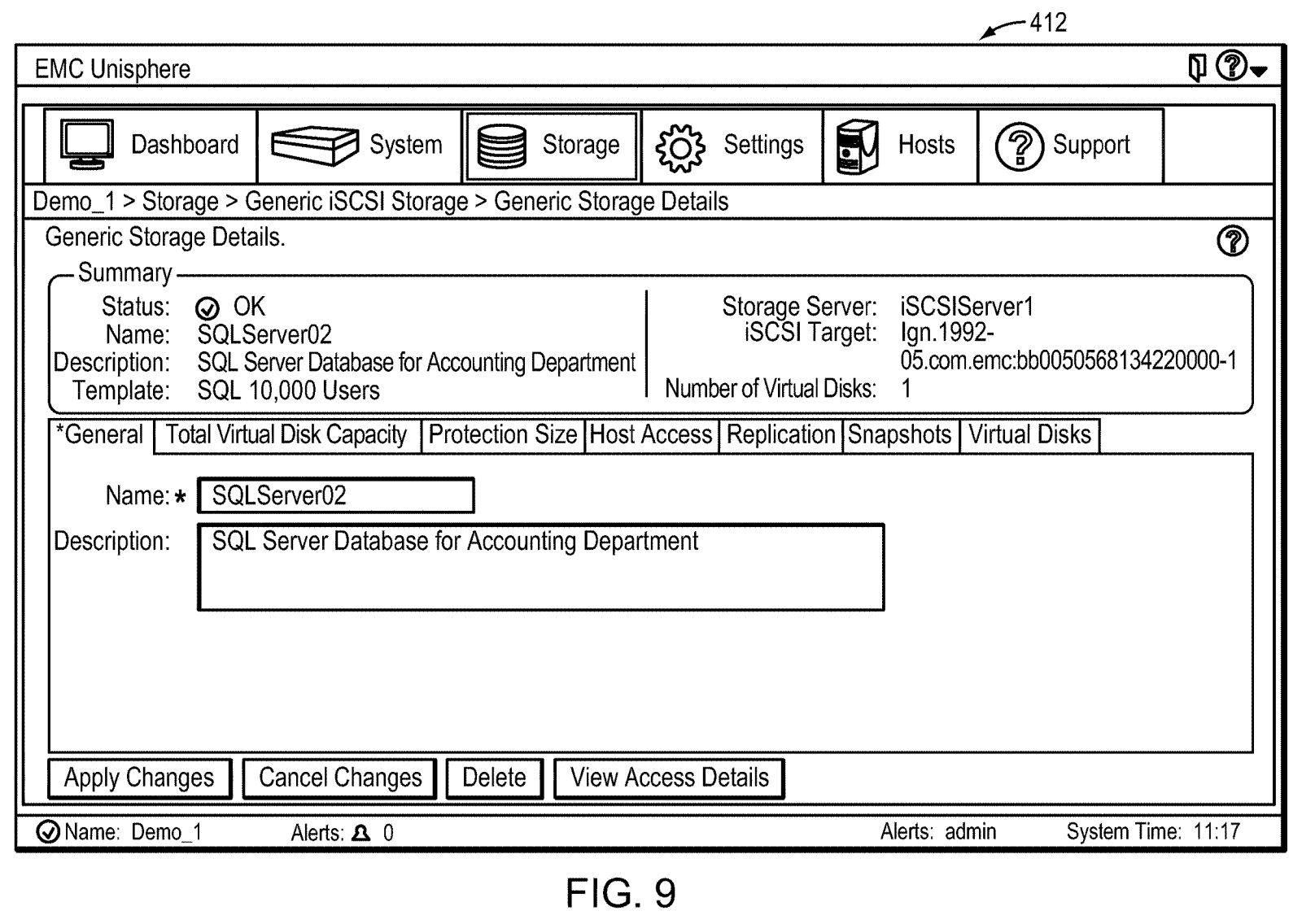

Referring to FIG. 9, shown is an illustration of one of the many ways an application aware template may be provided to a user in data storage systems. Shown in FIG. 9 is an example of snapshot 412 of a user interface of data storage system 12 indicating details of an application aware template selected by a user.

Referring to FIG. 10, shown is an illustration of one of the many ways an application aware template may be created in data storage systems. Shown in FIG. 10 is an example of an application aware template 414 created for data storage system 12. For example, the application aware template includes a set of rules, and a set of configuration preferences (such as hardware, software, storage) for Microsoft® Exchange 2003 application.

Referring to FIG. 11, shown is an illustration of one of the many ways an application aware template may be created in data storage systems. Shown in FIG. 11 is an example of an application aware template 416 created for data storage system 12. For example, the application aware template includes a set of configuration preferences (such as hardware, software, storage) for Microsoft® Exchange 2003 application that may support up to 500 users.

Referring to FIG. 12, shown is an illustration of one of the many ways an application aware template may be created in data storage systems. Shown in FIG. 12 is an example of an application aware template 418 created for data storage system 12. For example, the application aware template includes a set of configuration preferences (such as hardware, software, storage) for Microsoft® Exchange 2003 application.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in using application aware templates for configuring data storage systems, the method comprising:
   providing a set of application aware templates to a user through a user interface for selecting an application aware template for provisioning storage in a data storage system, wherein each application aware template in the set of application aware templates is based on a file format and includes a set of configuration preferences for provisioning storage for an application based on best practices for the application, the set of configuration preferences including storage configurations of storage objects and capabilities of storage pools, wherein each configuration preference describes the best practices for provisioning storage for the application, wherein each application aware template of the set of application aware templates is uploaded to the data storage system after the set of application aware templates is created and stored at a specific location within the data storage system, wherein each application aware template of the set of application aware templates is provided to the user upon registration of each application aware template on the data storage system, wherein the user interface provides a mechanism for registering, uploading, and executing each application aware template of the set of application aware templates without having to upgrade storage system software of the data storage system;
   validating the set of configuration preferences of the application aware template based on storage configuration policies of the data storage system by verifying whether the set of configuration preferences can be applied to the data storage system based on the storage configuration policies of the data storage system;
   determining whether sufficient amount of storage space is available on the data storage system for provisioning storage space for the application based on the set of configuration preferences of the application aware template;
   based on the determination that the sufficient amount of storage space is available, validating the application aware template and registering the validated application aware template as an available application aware template for selection by the user through the user interface; and based on the determination that the sufficient amount of storage space is not available, failing the validation of the application aware template; and executing the validated application aware template provided by the user for configuring the data storage system, wherein the validated application aware template provisions the storage for the application by interacting with the data storage system.

2. The method of claim 1, wherein a configuration preference of the set of configuration preferences include a rule indicating an application best practice.

3. The method of claim 1, wherein the application aware template is selected by a user using a user interface.

4. The method of claim 3, wherein the user interface resides on the data storage system.

5. The method of claim 3, wherein the user interface resides on a remote system.

6. The method of claim 1, wherein the application aware template is based on a file format, wherein the application aware template is registered as an available application aware template for selection by a user.

7. The method of claim 1, further comprising:
provisioning storage for an application based on the set of configuration preferences of the application aware template indicating best practices of the application.

8. The method of claim 1, further comprising:
using information of an application service provider layer of the data storage system in conjunction with the set of configuration preferences of the application aware template for provisioning storage for an application, wherein the information of the application service provider layer includes best practices of an application.

9. A system for use in using application aware templates for configuring data storage systems, the system comprising a memory and a processor in communication with the memory, the processor configured to:

provide a set of application aware templates to a user through a user interface for selecting an application aware template for provisioning storage in a data storage system, wherein each application aware template in the set of application aware templates is based on a file format and includes a set of configuration preferences for provisioning storage for an application based on best practices for the application, the set of configuration preferences including storage configurations of storage objects and capabilities of storage pools, wherein each configuration preference describes the best practices for provisioning storage for the application, wherein each application aware template of the set of application aware templates is uploaded to the data storage system after the set of application aware templates is created and stored at a specific location within the data storage system, wherein each application aware template of the set of application aware templates is provided to the user upon registration of each application aware template on the data storage system, wherein the user interface provides a mechanism for registering, uploading, and executing each application aware template of the set of application aware templates without having to upgrade storage system software of the data storage system;

validate the set of configuration preferences of the application aware template based on storage configuration policies of the data storage system by verifying whether the set of configuration preferences can be applied to the data storage system based on the storage configuration policies of the data storage system;

determine whether sufficient amount of storage space is available on the data storage system for provisioning storage space for the application based on the set of configuration preferences of the application aware template;

based on the determination that the sufficient amount of storage space is available, validate the application aware template and registering the validated application aware template as an available application aware template for selection by the user through the user interface; and based on the determination that the sufficient amount of storage space is not available, fail the validation of the application aware template; and execute the validated application aware template provided by the user for configuring the data storage system, wherein the validated application aware template provisions the storage for the application by interacting with the data storage system.

10. The system of claim 9, wherein a configuration preference of the set of configuration preferences include a rule indicating an application best practice.

11. The system of claim 9, wherein the application aware template is selected by a user using a user interface.

12. The system of claim 11, wherein the user interface resides on the data storage system.

13. The system of claim 11, wherein the user interface resides on a remote system.

14. The system of claim 9, wherein the application aware template based on a file format, wherein the application aware template is registered as an available application aware template for selection by a user.

15. The system of claim 9, further comprising:
provision storage for an application based on the set of configuration preferences of the application aware template indicating best practices of the application.

16. The system of claim 9, further comprising:
use information of an application service provider layer of the data storage system in conjunction with the set of configuration preferences of the application aware template for provisioning storage for an application, wherein the information of the application service provider layer includes best practices of an application.

* * * * *